United States Patent
Hopkins

(10) Patent No.: US 7,032,809 B1
(45) Date of Patent: Apr. 25, 2006

(54) SEAM-WELDED METAL PIPE AND METHOD OF MAKING THE SAME WITHOUT SEAM ANNEAL

(75) Inventor: Howard C. Hopkins, Leawood, KS (US)

(73) Assignee: Steel Ventures, L.L.C., Manhattan, KS (US)

( * ) Notice: Subject to any disclaimer, the term of this patent is extended or adjusted under 35 U.S.C. 154(b) by 175 days.

(21) Appl. No.: 10/346,239

(22) Filed: Jan. 17, 2003

Related U.S. Application Data

(60) Provisional application No. 60/349,901, filed on Jan. 18, 2002.

(51) Int. Cl.
*B23K 11/00* (2006.01)
*B23K 13/02* (2006.01)

(52) U.S. Cl. .................. 228/200; 219/60 R; 219/607; 219/617

(58) Field of Classification Search ............... 228/200, 228/46, 144–151, 173.6, 173.7; 219/600, 219/603, 607, 612, 613, 617, 643, 59.1, 60 R, 219/60.2, 61, 78.01, 86.1, 86.31, 120, 61.7
See application file for complete search history.

(56) References Cited

U.S. PATENT DOCUMENTS

| | | | |
|---|---|---|---|
| 3,619,535 A | 11/1971 | Sullivan ..................... | 219/8.5 |
| 4,152,568 A | 5/1979 | Yamaguchi et al. ....... | 219/61.7 |
| 4,218,604 A | 8/1980 | Masaoka et al. ........... | 219/61.7 |
| 4,223,197 A | 9/1980 | Imai et al. ................. | 219/61.7 |
| 4,375,995 A * | 3/1983 | Sugino et al. .............. | 148/584 |
| 4,387,845 A | 6/1983 | Mefferd ..................... | 228/222 |
| 4,418,258 A | 11/1983 | McNealy et al. .......... | 219/10.41 |
| 4,426,236 A * | 1/1984 | Sugino et al. .............. | 148/333 |
| 4,427,463 A | 1/1984 | Spies ......................... | 148/129 |
| 4,505,763 A | 3/1985 | Sugihara et al. ........... | 148/127 |
| 4,527,033 A | 7/1985 | Matsuyama et al. ........ | 219/61 |
| 4,796,798 A | 1/1989 | Tsuta et al. ................ | 228/146 |
| 4,811,888 A | 3/1989 | Ziemek et al. ............. | 228/148 |
| 4,838,477 A | 6/1989 | Roach et al. ............... | 228/222 |

(Continued)

FOREIGN PATENT DOCUMENTS

JP 361142025 A * 6/1986

(Continued)

OTHER PUBLICATIONS

Derwent-Acc-No.: 1975-26693W.*

*Primary Examiner*—Kiley S. Stoner
(74) *Attorney, Agent, or Firm*—Faegre & Benson LLP

(57) ABSTRACT

An apparatus and method for making a seam-welded steel pipe free of untempered martensite without seam anneal. The method includes selecting a steel containing a carbon concentration below a predetermined level, for example, 0.14% or 0.12% by weight. The method also includes flooding both outside and inside of the strip with a coolant while the weld seam is being formed, and continuing to immerse the welded strip for a sufficient time after the weld seam is formed to prevent the formation of untempered martensite. The apparatus includes a heater capable of heating the strip to a temperature sufficient to form a welded seam, a cooling module configured to supply a coolant to the welded seam both inside and outside of the strip as the weld seam is being formed, and another cooling module configured to immerse the welded strip in a coolant after the weld seam is formed for a sufficient length of time to prevent the formation of untempered martensite.

12 Claims, 8 Drawing Sheets

U.S. PATENT DOCUMENTS

| | | | | |
|---|---|---|---|---|
| 4,857,697 A | * | 8/1989 | Melville | 219/121.63 |
| 5,014,901 A | | 5/1991 | Moran | 228/119 |
| 5,119,729 A | * | 6/1992 | Nguyen | 102/307 |
| 5,327,812 A | | 7/1994 | Weyer et al. | 92/144 |
| 5,820,703 A | | 10/1998 | Suzuki et al. | 148/593 |
| 5,902,497 A | | 5/1999 | Alber et al. | 219/121.63 |

FOREIGN PATENT DOCUMENTS

| | | | |
|---|---|---|---|
| JP | 363028831 A | * | 2/1988 |
| JP | 02000271761 A | * | 10/2000 |

* cited by examiner

SEAM-WELDED METAL PIPE AND METHOD OF MAKING THE SAME WITHOUT SEAM ANNEAL

CROSS REFERENCE TO RELATED APPLICATION

This application claims the benefit of U.S. Provisional Application Ser. No. 60/349,901 filed Jan. 18, 2002.

FIELD OF THE INVENTION

The invention relates generally to welded metal structures and method of making such metal structures. More particularly, the invention relates to seam-welded steel pipes substantially free of untempered martensite and a method and apparatus for making such pipes without seam anneal.

BACKGROUND OF THE INVENTION

In welding, the mechanical properties of welded joints and of their vicinities are of critical importance. Microstructures and stress distributions in these regions greatly affect the strength of the joints and hence the entire welded structure. Improperly treated welded joints can result in serious structural failure.

For example, in welding of carbon steel, the welded joints and surrounding regions are first heated to produce coalescence and then cooled down. Typically, the cooling rate is sufficiently high so that martensite is formed through a diffusionless phase transformation. Because untempered martensite is typically more brittle than the base steel, and because thermal stress tends to build up during rapid cooling, the welded joints and surrounding regions are prone to fracture if not heat-treated properly.

Traditionally, to improve the strength of welded joints, heat treatment is typically carried out to reduce or eliminate untempered martensite or thermal stress. Heat treatment typically includes an annealing cycle, in which the welded structure is heated and then slowly cooled to the ambient temperature to obtain desired phases and microstructure in the welded joints. For example, electric-resistance welded carbon steel pipes conforming to the standard A53-B § 4.3 set by the American Society for Testing and Materials ("ASTM") must be treated (commonly referred to as "seam anneal") after welding to a minimum of about 538° C. (1000° F.) so that no untempered martensite remains or otherwise processed in such a manner that no untempered martensite remains.

The traditional seam anneal is a time- and resource-consuming process. Annealing equipment and power supplies separate from the welding equipment are typically needed. The separate welding and annealing steps contribute to the complexity and length of time of the manufacturing process. In addition, the traditional seam anneal does not consistently remove untempered martensite because the welding seam typically does not follow a perfectly straight line and thus does not always pass the same position in the heating zone in an annealing device, resulting in uneven heat treatment.

The invention disclosed herein is aimed at reducing or eliminating one or more deficiencies in the conventional metal welding technology.

SUMMARY OF THE INVENTION

Generally, the invention provides an efficient process for high quality welded metal structures. More particularly, the invention eliminates the annealing step typically required for conventional welding processes.

According to one aspect of the invention, a method of making a welded structure without producing a predetermined, undesirable, phase includes (a) forming a welded joint between two metal portions at a first temperature, and (b) subsequently cooling the joint to ambient temperature at a rate such that the predetermined, undesirable, phase substantially does not exist at the end of the cooling process.

The step of forming a welded joint can include forming the joint while immersing the joint being formed in a coolant, and the cooling step can include continuing to immerse the joint in the coolant for a period of time after forming the welded joint, the period of time being sufficient to prevent the formation of the predetermined, undesirable, phase.

The method can be one of making a welded carbon steel structure, such as a seam-welded steel pipe, where the predetermined, undesirable, phase is untempered martensite. The step of forming a welded joint can include heating (e.g., by inductive heating) the opposing longitudinal edges of the stock material that has been formed into tubular shape to at least 982–1093° C. while immersing the joint being formed in a coolant. The subsequent cooling step can include continuing to immerse the joint in the coolant for a period of time after forming the joint, the period of time being sufficient to prevent formation of untempered martensite. More specifically, the cooling rate can be such that the time it takes the temperature of the welded joint to drop through the martensite formation temperature range (or from 1000° C. to ambient temperature) is 10–15 seconds or longer.

The method of making the welded carbon steel structure can further include providing a stock material that has a carbon content below a certain level, such as 0.14% or 0.12% by weight.

According to another aspect of the invention, a welded metal structure is made by the method of the invention.

According to another aspect of the invention, an apparatus for making a welded structure without producing a predetermined, undesirable, phase includes (a) a welder, such as an inductive welder, configured to form a welded joint between two metal portions at a first temperature, and (b) a cooling device configured to subsequently lower the temperature of the welded joint to ambient temperature at a rate such that the predetermined, undesirable, phase does not form.

BRIEF DESCRIPTION OF THE DRAWINGS

Other objects and advantages of the invention will become apparent upon reading the following detailed description and upon reference to the drawings in which.

Figure 1:
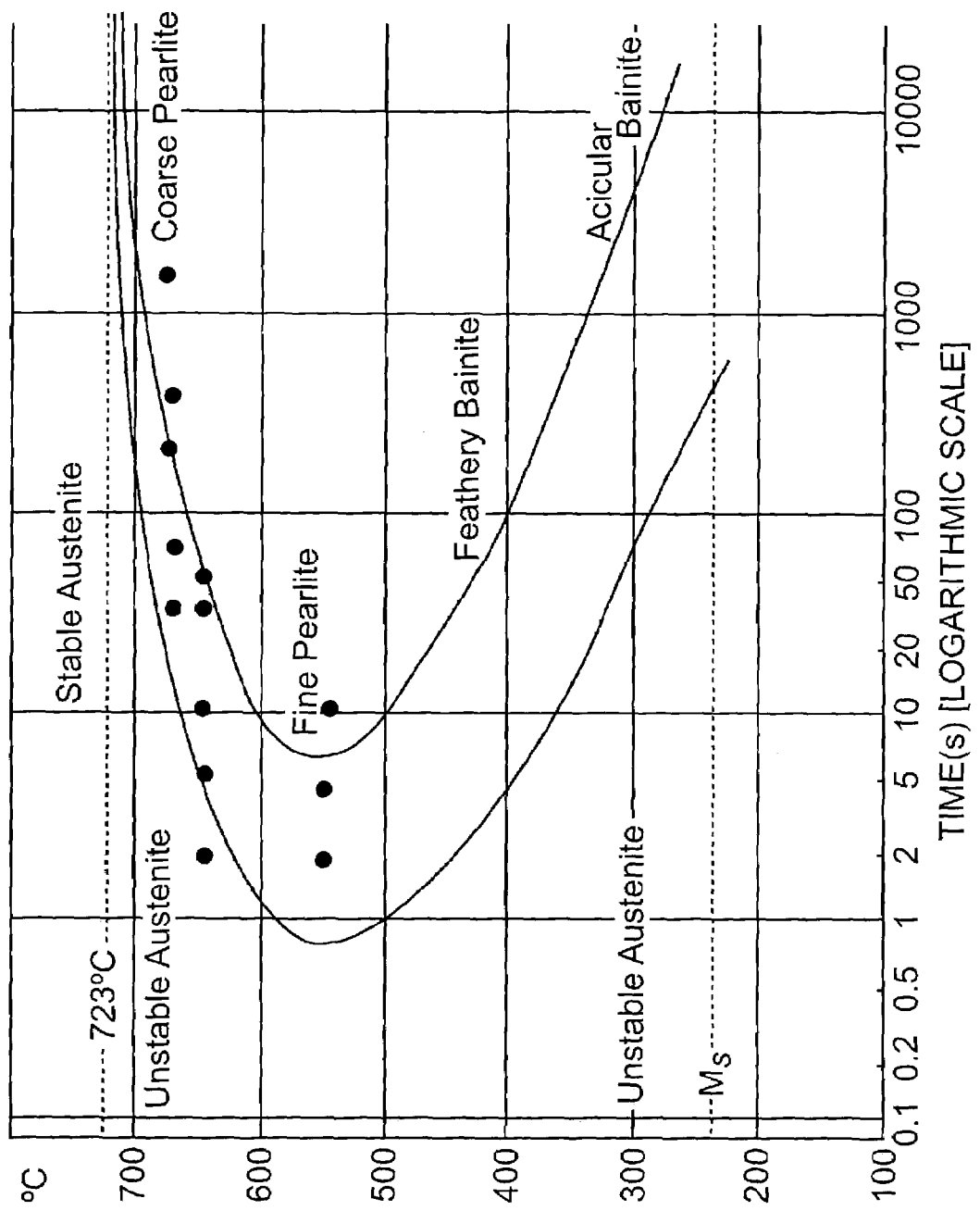
FIG. 1 schematically shows a T—T—T diagram of a hypoeutectic steel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Generally according to the invention, a welded metal structure without undesired phases, such as seam-welded steel pipe without untempered martensite, can be made without a seam anneal process separate from the welding process. The rate of cooling process after welding is controlled such that the conditions for forming the undesired phases do not occur. More specifically, a coolant can be used to surround the welded joint as the welded joint is formed as well as after the welded joint is formed. It is believed that the higher thermal capacity of the coolant than air serves to slow down the cooling process, thereby preventing the formation of the undesired phase associated with rapid cooling, or quenching.

As an example, schematically shown in FIG. 1 is a T—T—T diagram for a hypoeutectic carbon steel. When the steel is heated to above 1000° C. in welding and subsequently cooled to room temperature, what phases result depends on the cooling rate. If the cooling rate is sufficiently high, martensite is formed through a diffusionless phase transformation. If, however, the cooling rate is sufficiently low, martensite formation can be avoided. Immersing the welded joint in a coolant, both when the welded joint is being formed and afterwards, can result in sufficiently low cooling rates such that untempered martensite is not present in the final, cooled, welded joint. Because the phase transformation characteristics, and hence the T—T—T diagram, is composition-dependent, appropriate combinations between the cooling rate and steel composition (e.g., carbon content) can result in a substantially martensite-free welded joint.

Figure 2:
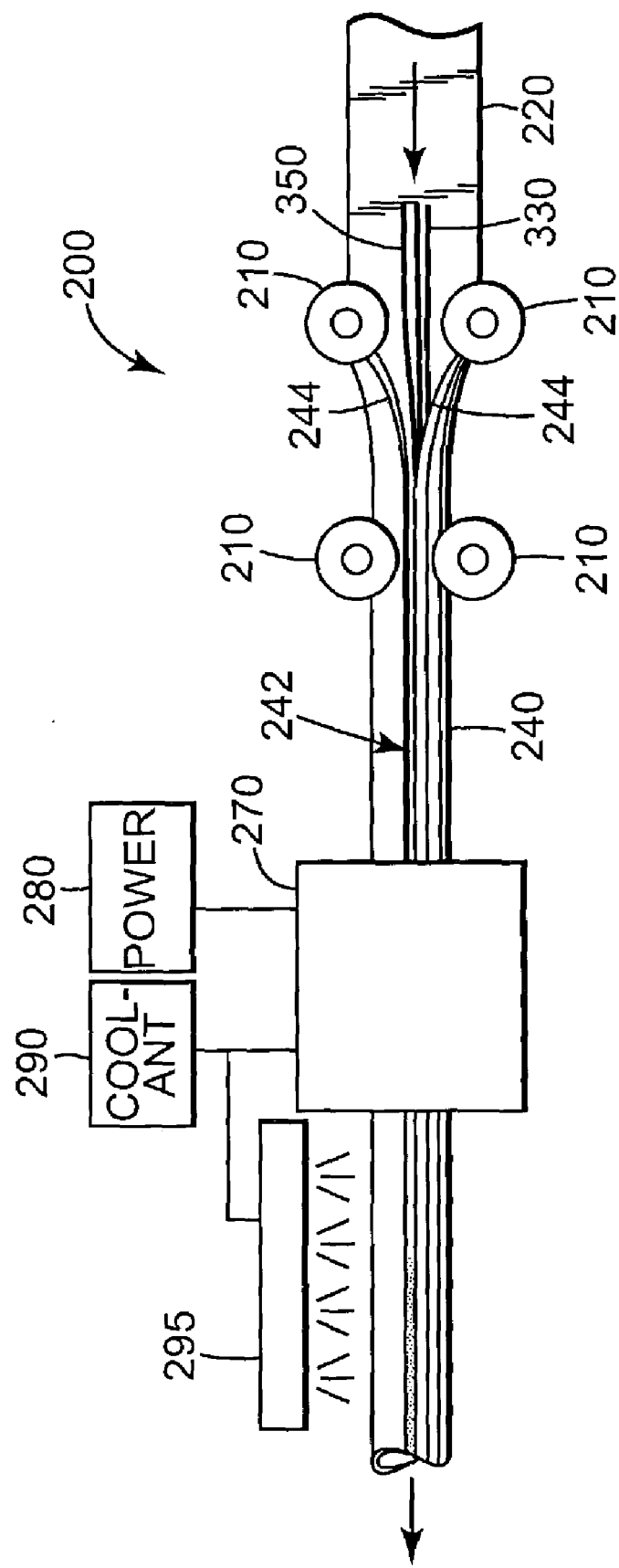
FIG. 2 schematically shows a welding apparatus in accordance with an aspect of the invention.
Figure 3:
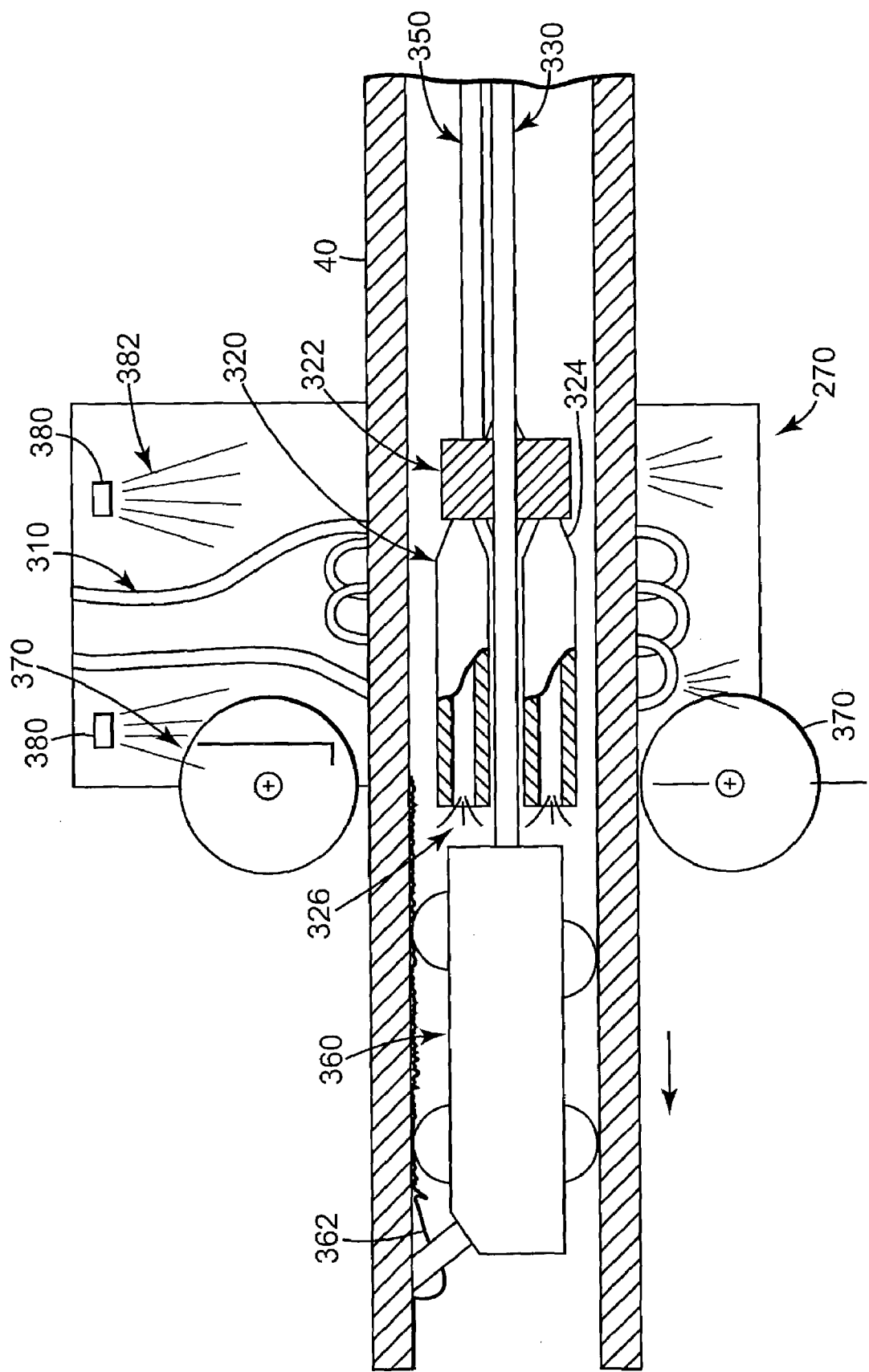
FIG. 3 schematically shows a more detailed view of the cooling device in the apparatus illustrated in FIG. 2.

According to one aspect of the invention, a welding apparatus 200, schematically illustrated in FIGS. 2 and 3, for making seam-welded steel pipe includes one or more shapers such as pairs of shaping rollers 210 for forming flat stock material 220 into a pipe-shaped strip 240 with a seam 242 between the edges 244. The apparatus 200 includes a welding heater 270, which can be induction welding coils 310 and impeder 320 positioned and configured to heat the opposing edges 244 to the desired welding temperature. Two or more pressure rollers 370 are positioned and configured to receive the strip segment with the heated edges 244 and compress them together to produce a welded joint. A power supply 280 energizes the induction coils 310. A coolant source 290, supplies a coolant to nozzles 380, which is adapted to spray coolant 382 over the induction coils 310 and the welding zone, the portion of the strip 240 generally inside the space defined by the coil 310. There can be any suitable number of nozzles 380 arranged over the induction coil 310 for cooling the coil 310 and the welding zone. The coolant source also supplies coolant to a cooling bed 295 including an array of nozzles (not shown) downstream from the welding heater 270 and arranged over a range, for example, 25 to 35 feet. Those nozzles in the cooling bed 295 are designed to continue to immerse the strip 240 in coolant for a period of time after the welded seam has been formed. The nozzles in the cooling bed 295 can be spaced, for example, about 12" apart or other distances to provided sufficient coolant to the welded strip 240.

As illustrated in more detail in FIG. 3, the impeder 320 is positioned inside the strip 240 by a holder 330. The impeder 320 includes a coolant manifold 322, which distributes coolant supplied by a coolant line 350 to the impeder elements 324. The holder 300 is also linked to an inside diameter cutting head 360 with a cutter 362 for shaving off any excess weld beads. The impeder elements 324 include channels 326 through the elements 324 so that coolant cool the elements 324 and is discharged inside the strip 240. At least a portion of the discharged coolant is partially blocked by the cutting head 360 and shavings from the excess weld bead and thus flood a substantial portion of the interior of the strip 240 during and after the weld seam is formed.

Figure 4:
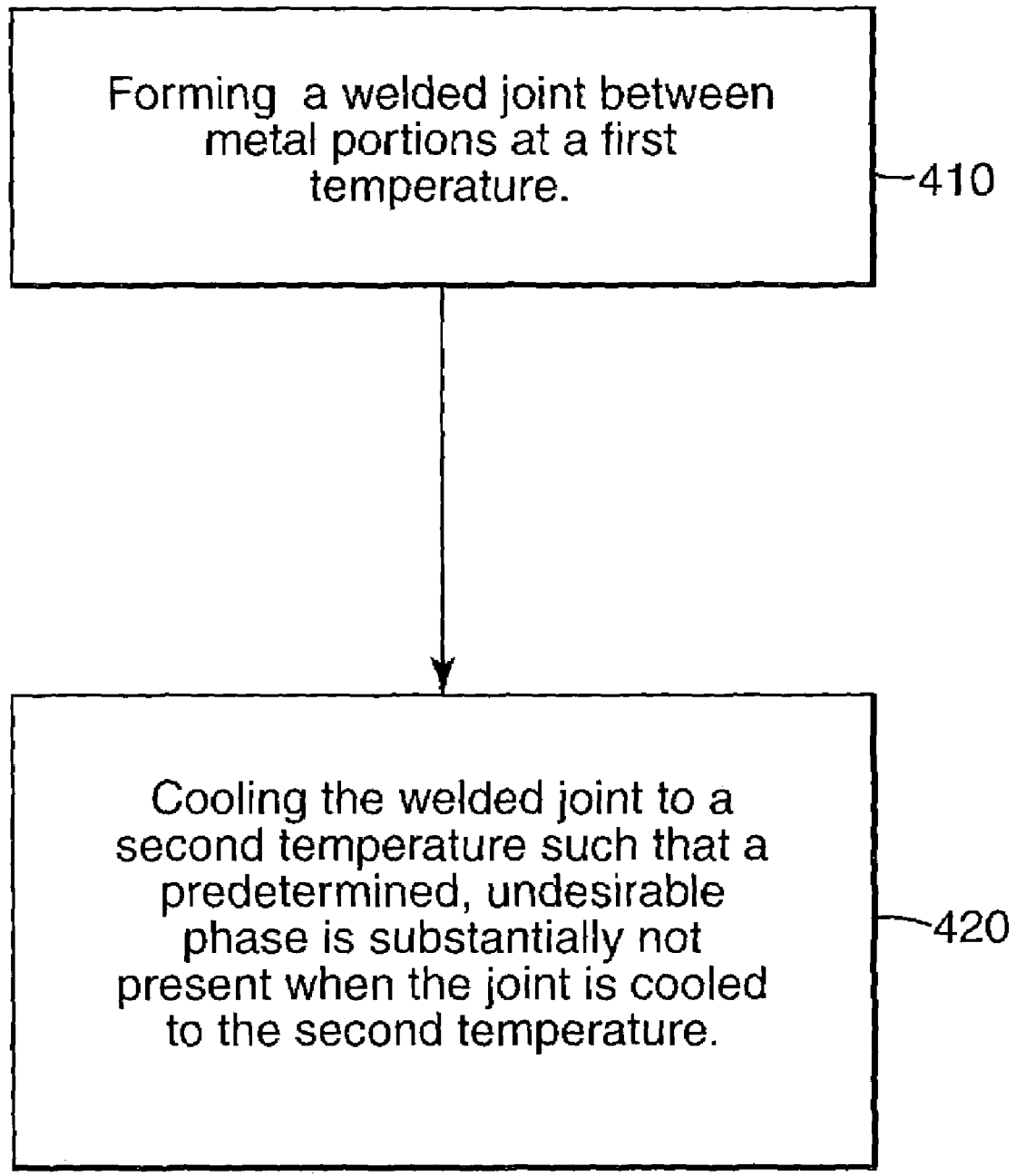
FIG. 4 outlines the steps in a method of making a welded structure according to one aspect of the invention.
Figure 5:
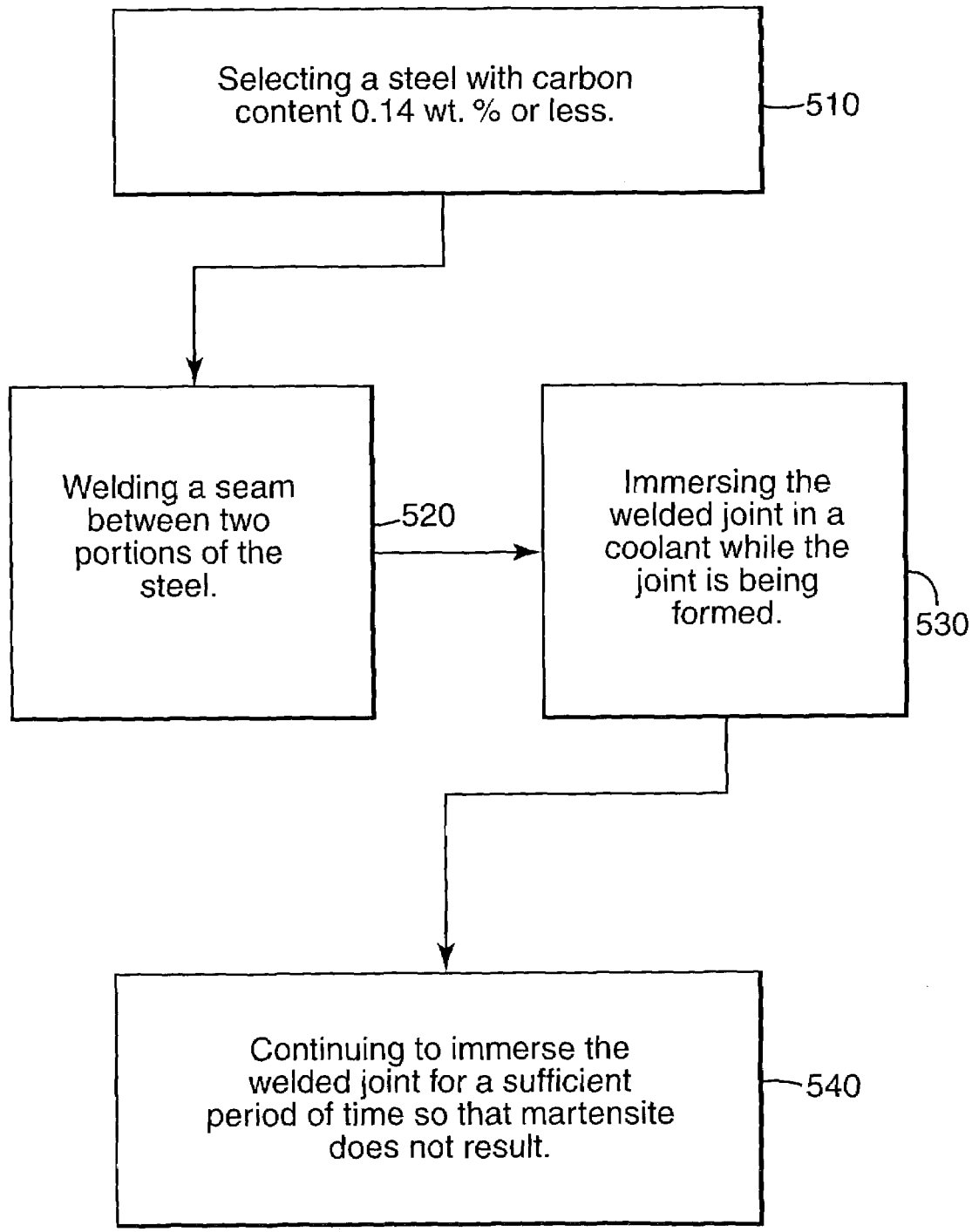
FIG. 5 outlines the steps in a method of making a welded steel structure according to another aspect of the invention.

With additional references to FIGS. 4 and 5, in operation, a suitable stock material is selected. For example, for making a steel pipe, a strip of flat steel plate 220 can be selected. Low carbon steel can be used. For example, steel with carbon content of 0.14 wt. % or lower, such as 0.12 wt. % or lower, can be used (510). The steel plate 220 is then formed into a C-shaped strip 240 by the rollers 210. The seam 242 formed by the edges 244 of the strip is then welded (410, 520) by suitable means, for example induction welding. The seam 242 passes through the heat zone of the induction heater 270, where the edges 244 of the seam 242 are heated to the required welding temperature, typically about 1000° C. or higher. At about the same time, the C-shaped strip 240 is compressed by the rollers 280 to result in a welded joint between the edges 244 of the seam 242.

The cooling rate of the welded joint is then controlled such that an undesired phase, such as untempered martensite in steel, is not present in the final product (420). In the example of steel pipes, the welded joint is flooded with a coolant as the welded joint is formed (530) and remains flooded for a time period afterwards (540). The time period is sufficient to prevent the formation of untempered martensite. The coolant can be of any suitable type, including many well-known types of commercially available roll-forming coolant. For example, a mill coolant with approximately 90% de-ionized water and 10% soap (available from Coral Chemical) can be used. Coolants of room temperature or any suitable temperature can be used and can be continuously recycled, filtered and the re-circulated. In the embodiment illustrated in FIGS. 2 and 3, the coolant injected from nozzles 380 and impeder 320 to flood the welded joint both outside and inside of the strip 240. The cutting head 360 from the inside the pipe can serve to partially block the coolant flow inside the pipe 24, thereby building up a sufficient coolant level to keep a significant portion of the cross-section of the strip 240 flooded.

In addition, the strip 240 passes through the coolant bed 295 immediately after welding and the pipe continues to be immersed in coolant. At a weld forming speed of about 2–3 feet per second in a illustrative arrangement, the welded strip 240 is immersed in coolant 10–15 seconds after welding. It is thought that from contacting the heated portions of the strip 240, the coolant is heated to above the martensite formation temperature at least at the beginning point of the cooling process, i.e., immediately after the welded joint is formed, and that because of the high thermal capacity of the coolant compared to air, the coolant prevents the temperatures of the welded joint and other portions of the strip 240 from dropping fast enough to form untempered martensite.

EXAMPLES

Example 1

Figure 6:
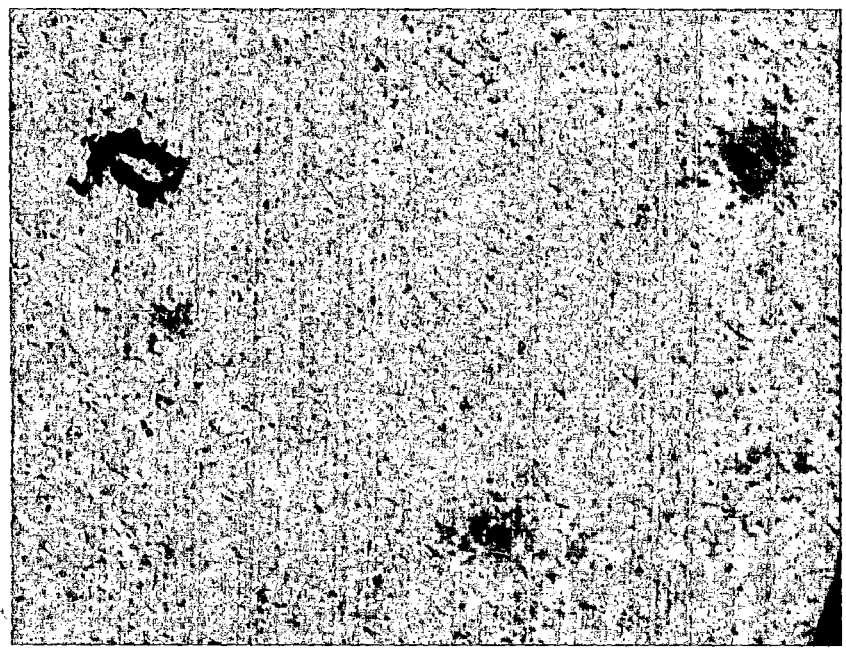
FIGS. 6–11 show microstructures of the welded joints made in accordance with one aspect of the invention.
Figure 7:

A pipe of 89 mm in diameter with a pipe wall of 5.5 mm in thickness was made under the following conditions from Grade B carbon steel specified under ASTM A 53B. FIGS. 6 and 7 show, respectively, two cross-sectional photomicrographs taken at the center of the welded joint at a magnification of 500.

Example 2

Figure 8:
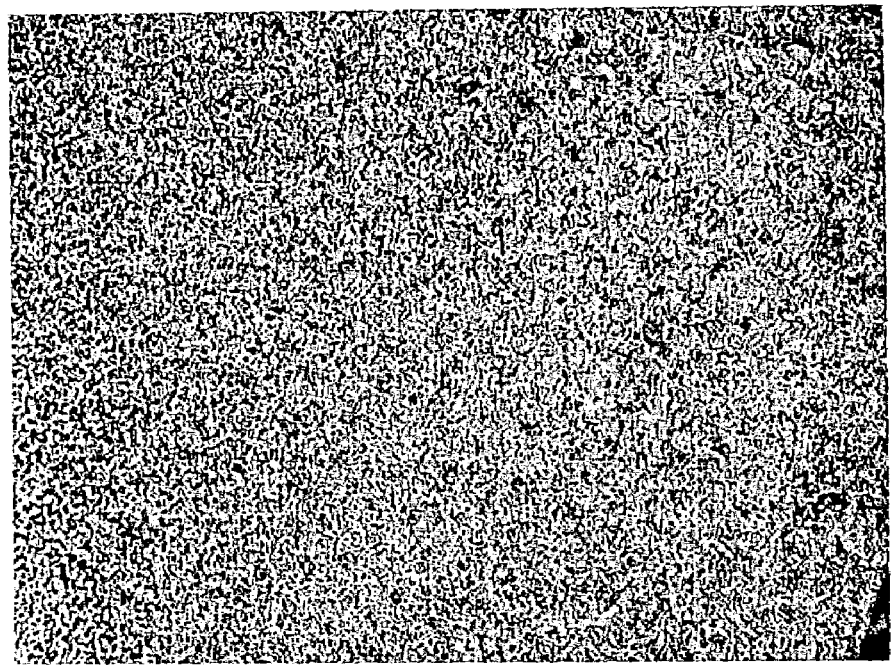
Figure 9:
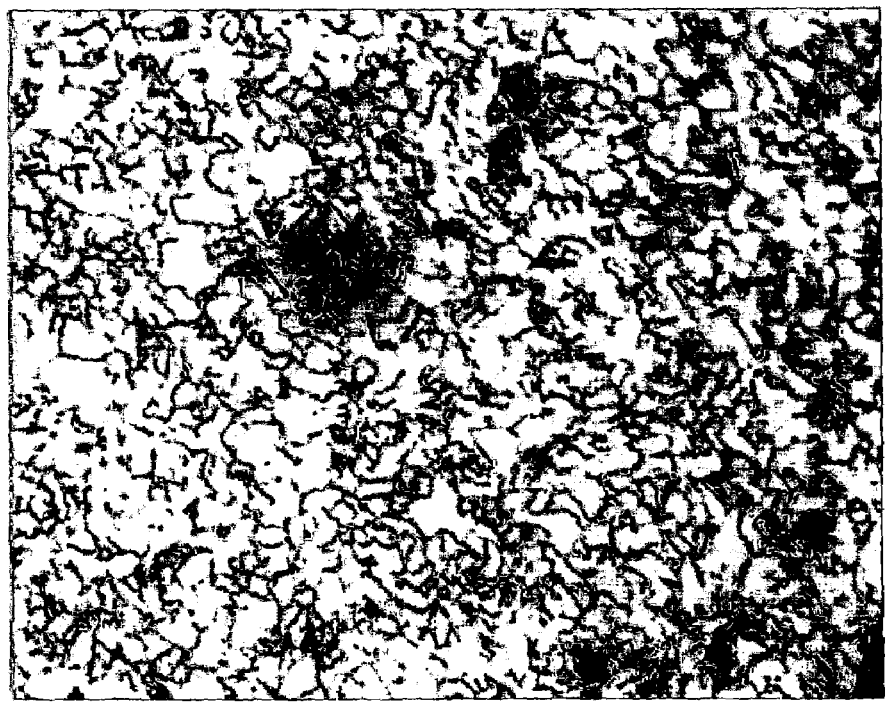

A pipe of 168 mm in diameter with a pipe wall of 7.1 mm in thickness was made under the following conditions from Grade B carbon steel specified under ASTM A 53B. FIGS. 8 and 9 show, respectively, two cross-sectional photomicrographs taken at the center of the welded joint at a magnification of 50 and 500.

Example 3

Figure 10:
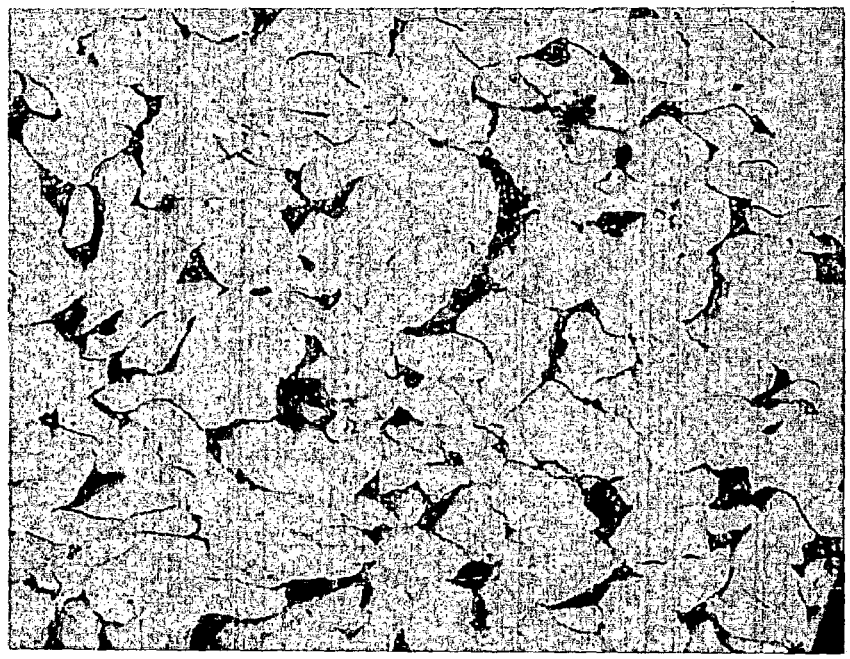
Figure 11:
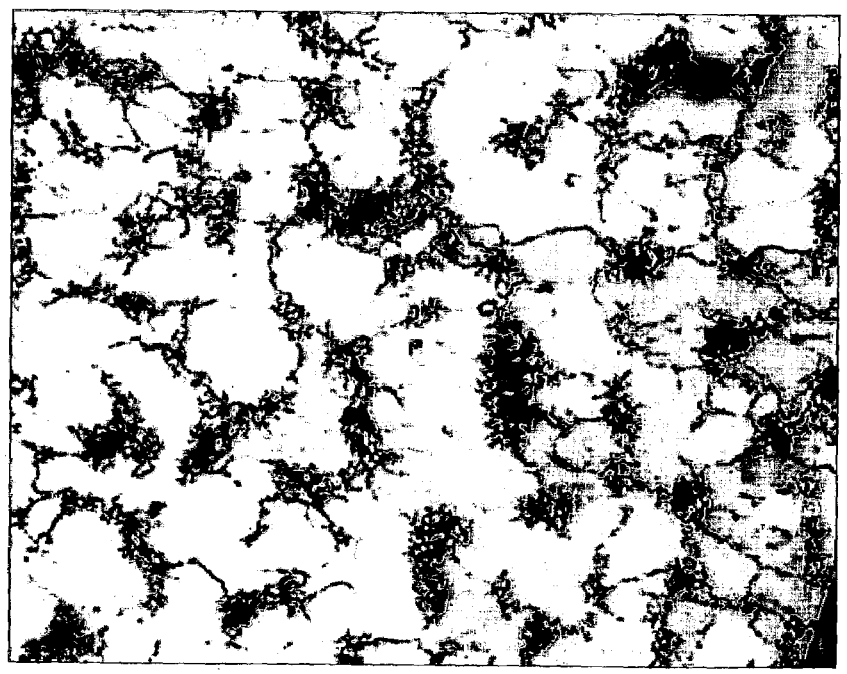

Another pipe of 168 mm in diameter with a pipe wall of 7.1 mm in thickness was made under the following conditions from Grade B carbon steel specified under ASTM A 53B. FIGS. 10 and 11 show, respectively, two cross-sectional photomicrographs taken at the top (at outside surface of the strip) and bottom (inside surface of the strip) of the welded joint at a magnification of 500.

In the above three examples, etchants (Nital and sodium meta bisulfite) were used to reveal the details of the microstructures. The welded joints were shown to contain predominately pearlite and ferrite. Untempered martensite was not detected in the samples.

Thus, the apparatus and method according the invention provide an efficient manufacturing process for making high-quality welded structures that do not contain undesirable phases such as untempered martensite. The costly post-welding seam-annealing process typically associated with traditional welding is eliminated.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of making a steel structure substantially free of untempered martensite, the method includes:
   (a) forming a welded joint between two steel portions;
   (b) applying a coolant to the welded joint while the welded joint is being formed; and
   (c) cooling the welded joint to below martensite formation temperature after the joint is formed by continuing to subject the welded joint to the coolant for a sufficient length of time so that substantially no untempered martensite is present in the welded joint when the welded joint is cooled to below martensite formation temperature.

2. A method of making a steel structure substantially free of untempered martensite, the method includes:
   (a) forming a welded joint between two steel portions by electrical resistance welding or inductive welding;
   (b) subjecting the welded joint to a coolant while the welded joint is being formed; and
   (c) cooling the welded joint to below martensite formation temperature after the joint is formed by continuing to subject the welded joint to the coolant for a sufficient length of time so that substantially no untempered martensite is present in the welded joint when the welded joint is cooled to below martensite formation temperature.

3. The method of claim 1, further comprising selecting a material for the two steel portions to contain not more that 0.14 weight percent carbon.

4. The method of claim 3, wherein the selecting step comprises selecting the material for the two steel portions to contain not more that 0.12 weight percent carbon.

5. A method of making a steel pipe, the method comprising:
   (a) forming a steel pipe segment with a gap along a longitudinal direction of the pipe, the gap being defined between two opposing steel edges; and
   (b) making a seam-sealed pipe according to the method of claim 1, wherein the steel structure is the seam-sealed pipe, and the two steel portions comprise the steel edges.

6. The method of claim 5, wherein the step of subjecting the welded joint to a coolant while the welded joint is being formed comprises applying the coolant to the welded joint from both inside and outside the pipe.

7. The method of claim 6, wherein the step of forming a welded joint comprises electrical resistance welding.

8. The method of claim 6, further comprising selecting a material for the two steel portions to contain not more that 0.14 weight percent carbon.

9. The method of claim 6, wherein the selecting step comprises selecting the material for the two steel portions to contain not more that 12 weight percent carbon.

10. The method of claim 1, wherein the step of forming a welded joint comprises induction welding or electrical resistance welding.

11. The method of claim 10, wherein the step of forming a welded joint comprises induction welding.

12. The method of claim 10, wherein the step of forming a welded joint comprises electrical resistance welding.

* * * * *

UNITED STATES PATENT AND TRADEMARK OFFICE
CERTIFICATE OF CORRECTION

| | |
|---|---|
| PATENT NO. | : 7,032,809 B1 |
| APPLICATION NO. | : 10/346239 |
| DATED | : April 25, 2006 |
| INVENTOR(S) | : Howard C. Hopkins |

Page 1 of 1

It is certified that error appears in the above-identified patent and that said Letters Patent is hereby corrected as shown below:

Column 6, line 47, delete "12" and insert therefor --0.12--

Signed and Sealed this

Twenty-fifth Day of July, 2006

JON W. DUDAS
*Director of the United States Patent and Trademark Office*